(12) United States Patent
Oguma

(10) Patent No.: US 6,601,401 B2
(45) Date of Patent: Aug. 5, 2003

(54) TEMPERATURE CONTROLLER AND LIGHT-WAVEGUIDE WITH THE SAME

(75) Inventor: Takefumi Oguma, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/961,224

(22) Filed: Sep. 24, 2001

(65) Prior Publication Data

US 2002/0035835 A1 Mar. 28, 2002

(30) Foreign Application Priority Data

Sep. 25, 2000 (JP) ........................................ 2000-289869

(51) Int. Cl.[7] ........................... F25D 23/12; G01R 31/02
(52) U.S. Cl. ........................ 62/259.2; 62/3.3; 324/760; 236/1 C
(58) Field of Search ............................. 62/3.3, 3.2, 3.6, 62/3.7, 259.2; 165/80.4; 136/201, 203; 324/760; 236/1 C

(56) References Cited

U.S. PATENT DOCUMENTS 5,567,909 A * 10/1996 Sugarman et al. .......... 136/201
5,667,301 A * 9/1997 Jurkowski et al. ............ 374/43

FOREIGN PATENT DOCUMENTS

JP         9-179078        7/1997

* cited by examiner

Primary Examiner—Chen Wen Jiang
(74) Attorney, Agent, or Firm—McGinn & Gibb, PLLC

(57) ABSTRACT

A temperature controller 51 is disclosed, which comprises a temperature control element 53 disposed on the bottom of a case 52, a light-waveguide element 11 and a metal plate 55 intervening between the elements 53 and 11. The metal groove 55 has a groove, in which a temperature sensor 36 is buried together with a highly heat conductive material. The detected temperature output of the temperature sensor 36 is inputted to a temperature control circuit 58 for controlling the temperature of the temperature control element 53. The temperature sensor 36 inclusive of its lead lines are buried in the metal plate 55 such as to cover a long distance. Thus, the temperature control is less subject to the influence of the ambient temperature and can thus be made with high accuracy.

12 Claims, 4 Drawing Sheets

PRIOR ART FIG.7
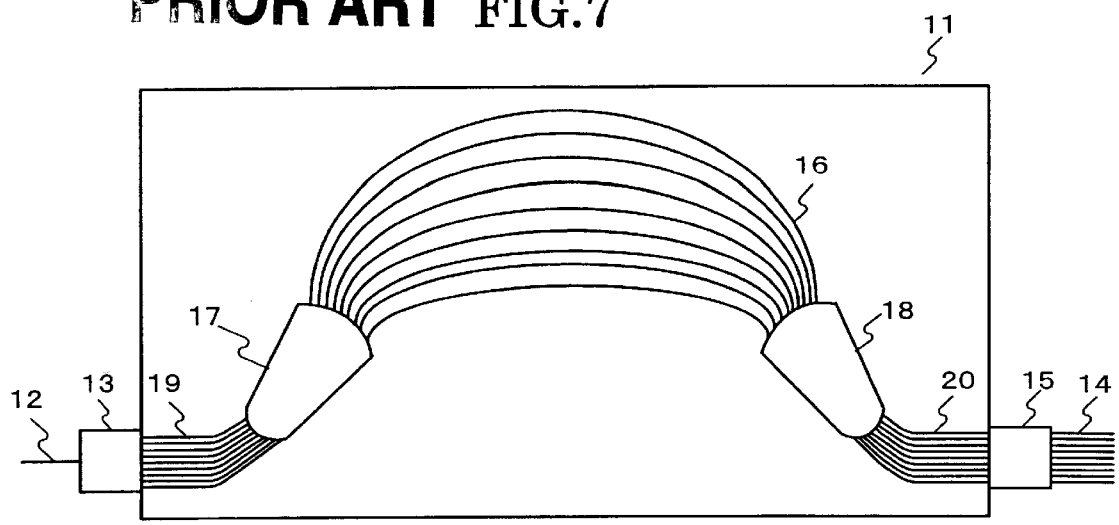
PRIOR ART FIG.8
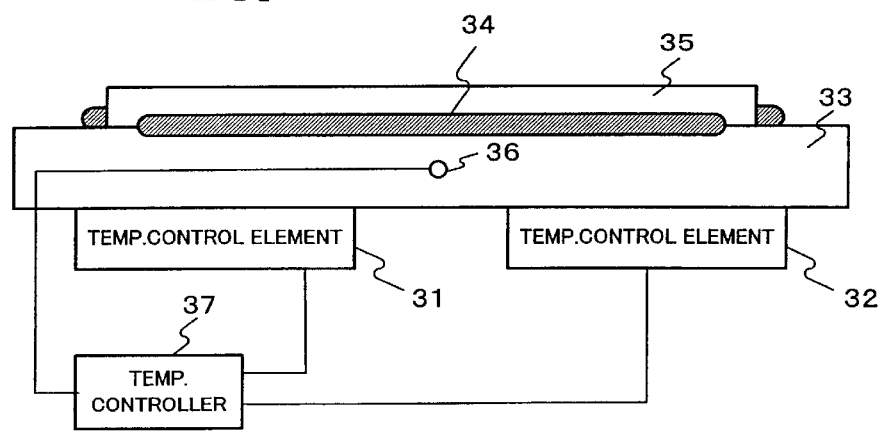
FIG.9
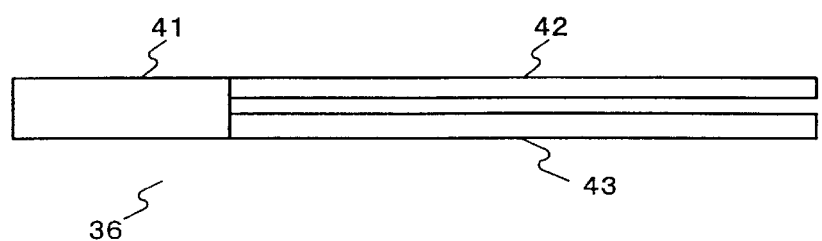

TEMPERATURE CONTROLLER AND LIGHT-WAVEGUIDE WITH THE SAME

BACKGROUND OF THE INVENTION

This application claims benefit of Japanese Patent Application No. 2000-289869 filed on Sep. 25, 2000, the contents of which are incorporated by the reference.

The present invention relates to temperature controllers and light-waveguide devices using these temperature controllers. More specifically, the present invention concerns temperature controllers for temperature controlling light-waveguides or like parts as subject of temperature control requiring highly accurate temperature control as accurately as possible and light-waveguide devices with such temperature controller.

Light-waveguides provide outputs of varying wavelengths depending on the ambient temperature of their installation spots.

FIG. 7 shows a light-waveguide device 11 as an example of the light-waveguide. An input side fiber array 13 is mounted on one end of the device 11 for connecting input fibers 12 thereto. An output side fiber array 15 is mounted on the other end of the device 11 for connecting output fibers 14 thereto. The device 11 has an array 16 of a plurality of channel waveguides disposed in a fashion of being curved in a predetermined direction with different radii of curvature in its substantially central position. An input side and an output side slub waveguides 17 and 18 are connected to the incidence and emission sides, respectively, of the channel waveguide array 16. Input and output waveguides 19 and 20 are disposed between the input side fiber array 13 and the input side slub waveguide 17 and between the output side slab waveguide 18 and the output side fiber array 15, respectively.

In this light-waveguide device 11, multiplexed signal light beams incident from the input waveguides 19 on the input side slab waveguide 17 are let to proceed along expandingly spaced-apart paths to be incident in in-phase relation to one another on the channel waveguide array 16. In the channel waveguide array 16, predetermined optical path length differences are provided along the constituent waveguides such that the optical path lengths thereof are progressively longer or shorter. Thus, light beams that are propagated through the constituent waveguides reach the output side slab waveguide 18 in phases different from one another at a predetermined interval. Actually, waveguide dispersion is present, and thus the in-phase place is tilted depending on the wavelength. As a result, the light beams are focused (or converged) in the interface between the output side slab waveguide 18 and the output waveguides 20 at different positions of the plane in dependence on the wavelengths. A given wavelength component thus can be taken out from each of the output waveguides 20, which are disposed at positions corresponding to the wavelengths.

In this light-waveguide device 11, variations of the temperature of the zone, in which the input side slab waveguide 17, the channel waveguide array 16 and the output side slab waveguide 18 are disposed, result in variations of the refractive index of the quartz glass itself constituting the zone, thus varying the slab length and the optical lengths of the channel waveguides. For example, with a temperature rise, the wavelength is shifted toward the longer wavelength side, thus increasing the optical loss.

Therefore, it has been in broad practice to control the temperature to be constant by cooling the light-waveguide device with a Peltier element. In this method, the device may be connected to a temperature sensor by disposing the device on the Peltier element. In this case, a problem is posed that the temperature of the device can not be controlled uniformly if the Peltier element is smaller in size than the device.

FIG. 8 shows an example of the temperature controller, which is proposed in Japanese Laid-Open No. 9-179078 as a solution to this problem. The illustrated temperature controller has a heat conductor member 33, which is mounted such as to commonly cover to portions of a pair of temperature control elements 31 and 32. A light-waveguide device 35 is mounted on the heat conductor member 33 via an intervening heat conductor medium 34 such as heat conductor grease. A temperature sensor 36 is disposed in a central portion of the heat conductor member 33 intermediate between the pair temperature control elements 31 and 32, and detects the temperature of this portion. The temperature sensor 36 outputs its temperature detection output to a temperature controller means 37, which controls the driving of the pair temperature control elements 31 and 32 to control the detected temperature to be constant.

In this proposed temperature controller, the heat conductor medium 34 is constant temperature controlled via the heat conductor member 33 having a certain heat capacity and thus without being influenced by the ambient temperature. For the temperature detection, the temperature sensor 36 is buried in the heat conductor member 33.

This prior art temperature controller uses two relatively small temperature control elements 31 and 32 for the temperature control of the light-waveguide 35. For uniform temperature control of the light-waveguide 35, the single heat conductor member 33 is interposed over the temperature control elements 31 and 32. For uniform temperature control of the light-waveguide 35, however, the heat conductor member 33 should have a certain great heat capacity. Therefore, a problem is posed that the temperature controller itself consumes increased power.

In the meantime, the temperature sensor 36 is buried in the heat conductor member 33 in an ordinary way such as providing a slight recess. In this case, the temperature-detecting tip of the temperature sensor 36 is enclosed in the heat conductor member 33. Thus, compared to the case of mounting the temperature sensor 36 on the outer surface of the heat conductor member 33, the temperature sensor 36 is less subject to the influence of the external temperature.

This temperature controller, however, has a problem that it is impossible to temperature control the light-waveguide 35 with sufficiently high accuracy even by enclosing the portion of the light-waveguide 35 with a heat-insulating member (not shown) or by enclosing the portion including the temperature control elements 31 and 32 as well as the light-waveguide 35 likewise with a heat-insulating member (not shown). The inventor of this invention confirmed that the most significant cause of this problem is that the temperature sensor 36 itself, such as thermistor, picks up the external temperature condition.

FIG. 9 expresses an example of the temperature sensor. While this example concerns a thermistor, the temperature sensor 36 has a temperature sensing portion 41 constituting its tip and a pair of leads 42 and 43 and a pair of lead lines 42 and 43. The distal ends of the pair lead lines 42 and 43 are connected to electric wires or the like (not shown) on the side of the temperature control means 37 for the transmission of a signal representing the temperature.

In the temperature sensor 36, the temperature sensing portion 41 at the tip is partly or fully buried in the heat conductor member 33. In some case, end portions of the lead lines 42 and 43 are buried. Most portion of the lead lines 42, 43 are, however, exposed to the outside of the hest conductor member 33. These lead lines 42 and 43 thus pick up the ambient temperature condition, and change the detected temperature itself of the temperature sensing portion 41.

To avoid this influence, it is conceivable to adopt such measure as cutting off portions of the lead lines 42 and 43 exposed to the outside of the heat conductor member 33 and connecting these portions to thicker electric wires or soldering these portions to a printed circuit board. In such case, however, the temperature of the electric wires or the soldered portions has greater influence on the temperature sensing portion 41. Therefore, such arrangement can not solve the problem.

SUMMARY OF THE INVENTION

An object of the present invention accordingly is to provide a temperature controller, which can reduce the influence of the ambient temperature of the lead line portions as much as possible to permit temperature control of the temperature control subject parts or components, particularly light-waveguide device, with high accuracy, and a light-waveguide device with such temperature controller.

According to the invention (1), there is provided a temperature controller comprising: a temperature control element serving for heating or cooling; a temperature control subject component which is temperature controlled by the temperature control element; a heat conductor member intervening between the temperature control subject component and the temperature control element and having a space in the form of a curve drawn with a single stroke from a predetermined position on the inner side of an edge up to a predetermined side edge portion, the curved space having a predetermined length; a temperature sensor including a temperature sensing tip disposed in the curved space of the heat conductor member at the predetermined position thereof and relatively thin lead lines led out from the temperature sensing tip, the lead lines being led together with a filler buried therewith through the curved space in the heat conductor member and having end potions led out from the side edge portion to the outside; and a temperature control means for driving the temperature control element on the basis of the result of temperature detection by the temperature sensor.

Specifically, according to the invention (1), the heat conductor member which is disposed such as to intervene between the temperature control element such as a Peltier element and the temperature control subject component such as a light-waveguide element, is formed with the space in the form of a curve with a single stroke from a predetermined position on the inner side of an edge of it (which may not be the central position) up to a predetermined side edge portion, and the temperature sensing tip of the temperature sensor is disposed in a space portion corresponding to the predetermined position noted above, and the relatively thin lead lines are led together with a filler buried therewith through the curved space in the heat conductor member and have their end portions led out to be exposed to the outside. Thus, it is possible to substantially ignore heat return from the exposed lead portions to the temperature sensing tip of the temperature sensor, that is, it is possible to obtain highly accurate temperature control by the temperature control means.

According to the invention (2), there is provided the temperature sensor according to the invention (1), wherein the heat conductor member is in the form or a rectangular plate having one surface thereof formed with a space in the overall form of a rectangular spiral curve with progressively increasing sides from the position, at which the temperature sensing tip of the temperature sensor is buried.

Specifically, according to the invention (2), the curved space with the temperature sensor element disposed therein is in a rectangular spiral form such as to correspond to the shape of the heat conductor member.

According to the invention (3), there is provided the temperature controller according to the invention (1), wherein the temperature control element is a Peltier element having a cooling surface, while the temperature control subject component is a light-waveguide element.

Specifically, according to the invention (3), the light-waveguide element is cooled by the Peltier element as a specific example of high accuracy temperature control. The temperature control element need not be one for cooling, and it may be an element or component (hereinafter referred to as element in general) for temperature increasing control. Such a heater type temperature control element may be such element as a silicon rubber heater made of silicon rubber, a ceramic heater, a nicrome heater, etc. as well.

According to the invention (4), there is provided the temperature controller according to the invention (3), wherein the heat conductor member is a metal plate greater in size than the Peltier element in contact with it.

Specifically, according to the invention (4), the heat conductor member is formed from an excellently heat conductive metal plate greater in size than the Peltier element, and thus it permits temperature control of the temperature control subject component in a wide range. As the metal plate, a copper plate is excellent in the heat conductivity and also in view of the cost. However, the metal member may also be one of other metal such as aluminum.

According to the invention (5), there is provided the temperature controller according to the invention (1), wherein the curved space is a groove formed in the metal surface on the side of the temperature control subject component.

Specifically, according to the invention (5), a groove is formed as the space. It is also possible to form the space by stamping off the metal itself.

According to the invention (6), there is provided the temperature controller according to the invention (1), wherein the lead lines of the temperature sensor are relatively thin electric wires for reducing the heat return ratio.

Specifically, according to the invention (6), relatively thin electric wires are used as the lead lines to reduce the ratio of heat return to the temperature sensing tip of the temperature sensor.

According to the invention (7), there is provided the temperature controller according to the invention (1), wherein the curved space formed in the heat conductor member in the form of a line drawn with a single stroke from the predetermined position up to the predetermined side edge portion extends in a folded fashion along a curved line approaching in from the predetermined position to the predetermined side edge portion.

Specifically, according to the invention (7), the single stroke curved space may not be spiral in form, and it may also be of a folded line form. Where such a curved line space is locally present in a position of the heat conductor member, the predetermined position noted above naturally may not be at the central position of the heat conductor member.

According to the invention (8), there is provided a temperature controller comprising a temperature control element serving for heating or cooling, a temperature control subject component which is temperature controlled by the temperature control element and a plate intervening between the temperature control subject component and the temperature control element, and a temperature sensing element including a temperature sensing tip for detecting temperature and lead lines led out from the temperature sensing tip, wherein: the temperature sensing tip is disposed in the plate; and the lead lines have portions disposed in a bent fashion from the position of the temperature sensing tip up to an edge of the plate.

Thus, by the portions disposed in a bent fashion the heat return to the temperature sensing tip of the temperature sensor via the bent line portions can be substantially ignored, and it is thus possible to obtain high accuracy temperature control.

According to the invention (9), there is provided a temperature controller comprising a temperature control element serving for heating or cooling, a temperature control subject component which is temperature controlled by the temperature control element and a plate intervening between the temperature control subject component and the temperature control element, and a temperature sensing element including a temperature sensing tip for detecting temperature and lead lines led out from the temperature sensing tip, wherein: the temperature sensing tip is disposed in the plate; and the lead lines have spirally disposed portions from the position of the temperature sensing tip up to an edge of the plate.

Thus, by the spirally disposed portions the heat return to the temperature sensing tip of the temperature sensor via the bent line portions can be substantially ignored, and it is thus possible to obtain high accuracy temperature control.

According to the invention (10), there is provided a temperature controller comprising a temperature control element serving for heating or cooling, a temperature control subject component which is temperature controlled by the temperature control element and a plate intervening between the temperature control subject component and the temperature control element, and a temperature sensing element including a temperature sensing tip for detecting temperature and lead lines led out from the temperature sensing tip, wherein: the temperature sensing tip is disposed in the plate; and the lead lines have meanderingly disposed portions from the position of the temperature sensing tip up to an edge of the plate.

Thus, by the meanderingly disposed portions the heat return to the temperature sensing tip of the temperature sensor via the bent line portions can be substantially ignored, and it is thus possible to obtain high accuracy temperature control.

According to the invention (11), there is provided the temperature controller according to one of the invention (8) to (10), wherein: the plate has a space, in which the temperature sensing tip and the lead lines are disposed; and the space in which the temperature sensing tip and the lead lines are disposed are filled with a resin.

Specifically, according to the invention (11), the curved space in which the temperature sensing tip and the lead lines are disposed, are filled with a resin, and heat transmitted from the outside via the lead liens escapes through the resin to the plate side. Thus, the heat return to the temperature sensing tip can be substantially ignored.

According to the invention (12), there is provided the temperature controller according to the invention (11), wherein the plate is a metal plate.

Specifically, according to the invention (12), a highly heat conductive metal plate is used. This is, however, by no means limitative. For example, a silicon plate may be used. It is further possible to use various other excellently heat conductive sheets or films.

According to the invention (13), there is provided a light-waveguide device with a temperature controller comprising a temperature control element serving for heating or cooling, a temperature control subject component which is temperature controlled by the temperature control element, a heat conductor member intervening between the temperature control subject component and the temperature control element and having a space in the form of a curve drawn with a single stroke from a predetermined position on the inner side of an edge up to a predetermined side edge portion, the curved space having a predetermined length, a temperature sensor including a temperature sensing tip disposed in the curved space of the heat conductor member at the predetermined position thereof and relatively thin lead lines led out from the temperature sensing tip, the lead lines being led together with a filler buried therewith through the curved space in the heat conductor member and having end potions led out from the side edge portion to the outside, and a temperature control means for driving the temperature control element on the basis of the result of temperature detection by the temperature sensor; and a light-waveguide element temperature controlled by the temperature controller.

Specifically, according to the invention (13), the light-waveguide device with temperature controller is obtained by combining the temperature controller as defined in the invention (1) according to the invention and the light-waveguide element, thus permitting highly accurate temperature control of the light-waveguide device.

According to the invention (14), there is provided a light-waveguide device with a temperature controller comprising a temperature control element serving for heating or cooling, a temperature control subject component which is temperature controlled by the temperature control element and a plate intervening between the temperature control subject component and the temperature control element, and a temperature sensing element including a temperature sensing tip for detecting temperature and lead lines led out from the temperature sensing tip, wherein the temperature sensing tip is disposed in the plate; and the lead lines have portions disposed in a bent fashion from the position of the temperature sensing tip up to an edge of the plate; and a light-waveguide element temperature controlled by the temperature controller.

Specifically, according to the invention (14), the light-waveguide device with temperature controller is obtained by combining the temperature controller as defined in the invention (8) according to the invention and the light-waveguide element, thus permitting highly accurate temperature control of the light-waveguide device.

According to the invention (15), there is provided a light-waveguide device with a temperature controller comprising a temperature control element serving for heating or cooling, a temperature control subject component which is temperature controlled by the temperature control element and a plate intervening between the temperature control subject component and the temperature control element, and a temperature sensing element including a temperature sensing tip for detecting temperature and lead lines led out from the temperature sensing tip, wherein the temperature sensing tip is disposed in the plate and the lead lines have spirally disposed portions from the position of the temperature sensing tip up to an edge of the plate; and a light-waveguide element temperature controlled by the temperature controller.

Specifically, according to the invention (15), the light-waveguide device with temperature controller is obtained by combining the temperature controller as defined in the invention (9) according to the invention and the light-waveguide element, thus permitting highly accurate temperature control of the light-waveguide device.

According to the invention (16), there is provided a light-waveguide device a with temperature controller comprising a temperature control element serving for heating or cooling, a temperature control subject component which is temperature controlled by the temperature control element and a plate intervening between the temperature control subject component and the temperature control element, and a temperature sensing element including a temperature sensing tip for detecting temperature and lead lines led out from the temperature sensing tip, wherein the temperature sensing tip is disposed in the plate and the lead lines have meanderingly disposed portions from the position of the temperature sensing tip up to an edge of the plate; and a light-waveguide element temperature controlled by the temperature controller.

Specifically, according to the invention (16), the light-waveguide device with temperature controller is obtained by combining the temperature controller as defined in the invention (10) according to the invention and the light-waveguide element, thus permitting highly accurate temperature control of the light-waveguide device.

According to the invention (17), there is provided the light-waveguide device according to one of the inventions (14) to (16), wherein the temperature sensing tip is disposed at a position corresponding to the central position of the channel waveguide array of the light-waveguide element. Specifically, according to the present invention as defined in the invention (17), for detecting the temperature of the channel waveguide array, which requires constant and highly accurate temperature control, the temperature sensor is disposed at a position corresponding to the central position of the array.

Other objects and features will be clarified from the following description with reference to attached drawings.

BRIEF DESCRIPTION OF THE DRAWINGS

FIG. 7 shows a prior art light-waveguide device;

FIG. 8 shows an example of a prior art temperature controller; and

FIG. 9 shows an example of the temperature sensor.

PREFERRED EMBODIMENTS OF THE INVENTION

Preferred embodiments of the present invention will now be described with reference to the drawings.

Figure 1:
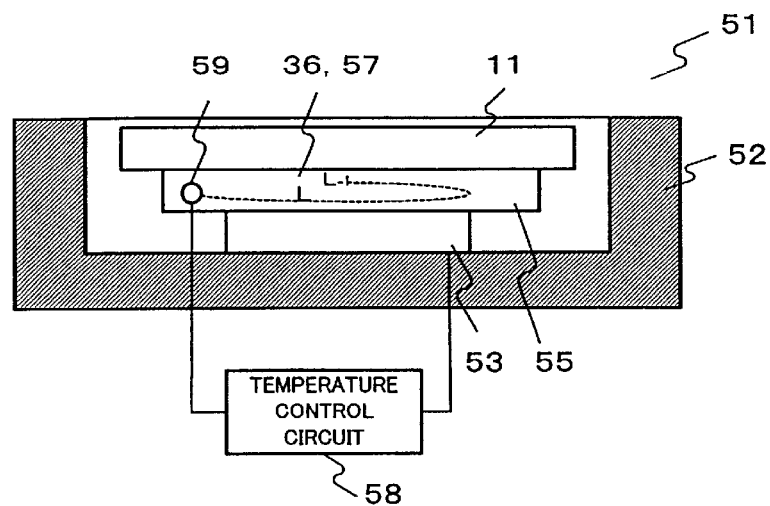
FIG. 1 shows an embodiment of the temperature controller according to the present invention in a state that a case portion on the front side of the device is cut away.

FIG. 1 shows an embodiment of the temperature controller according to the present invention in a state that a case portion on the front side of the device is cut away. A temperature controller 51 comprises a box-like case 52, a temperature control element 53 disposed on the bottom of the case 52 and constituted by a Peltier element serving as heating or cooling element, the light-waveguide element 11 shown in FIG. 7, and a metal pate intervening between the elements 11 and 53. In this embodiment, a highly heat conductive copper plate is used as the metal plate 55. For expanding the temperature control range of the temperature control element 53, the metal plate 55 has a size greater than the contact size of the temperature control element 53.

The metal plate 55 has a groove cut therein, and the temperature sensor 36 is buried together with a highly heat conductive material 57 in the groove. The detected temperature output of the temperature sensor 36 is inputted to a temperature control circuit 58 for temperature control of the temperature control element 53. The temperature sensor 36 buried in the metal plate 55 is led out from the metal member 55 at a position 59. In this embodiment, a thermistor like that described before in connection with FIG. 9 is used as the temperature sensor 36.

Figure 2:
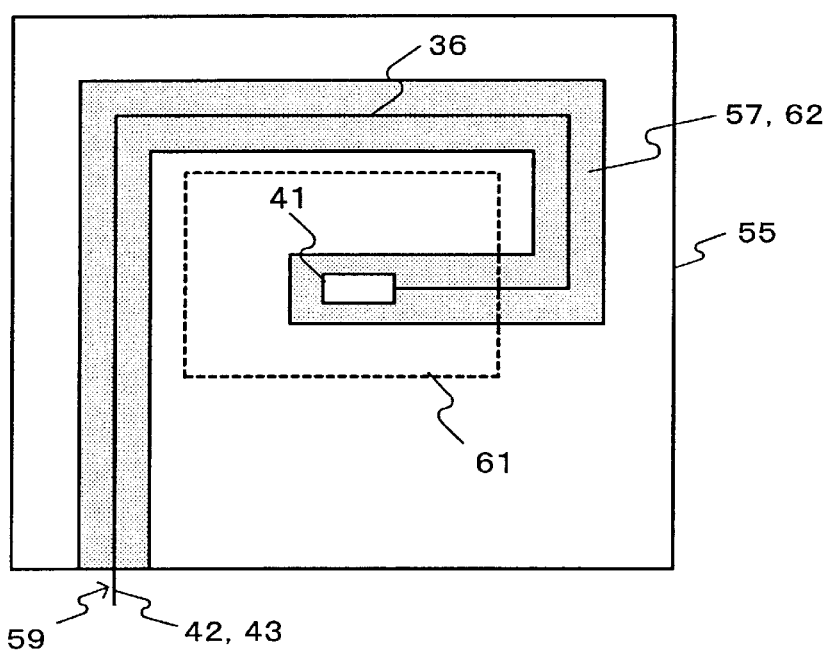
FIG. 2 shows the metal plate with the temperature sensor buried therein.

FIG. 2 shows the metal plate with the temperature sensor buried therein. A temperature sensing region 61 enclosed in a dashed rectangle in the metal plate 55, is in contact with a region of the light-waveguide element shown in FIG. 7, which region includes the channel waveguide array 16, the input side and output side slab waveguides 17 and 18. Thus, by detecting the temperature of the region 61 with high accuracy and controlling the detected temperature to a predetermined temperature, it is possible to prevent changes in the characteristics of the light-waveguide element 11 with temperature changes.

A groove 62 is formed in the surface of the metal plate 55 such as to trace a sort of rectangular spiral line from a substantially central position of the temperature sensing region 61. In the groove 61 the temperature sensor 36 is buried together with a highly heat conductive material 57. The temperature sensing tip 41 of the temperature sensor 36 is buried in the temperature sensing region 61 substantially at a central position thereof. From this position, the pair lead lines 42 and 43 are led in a spiral form through the metal plate 55 and led to the outside from their position 59. Relatively thin wires are used as the pair lead lines 42 and 43.

In such embodiment of the temperature controller 51, first the temperature control circuit 58 sets a control temperature at normal temperature. At this time, the circuit 58 finds out the optimum operating point by changing the temperature of the temperature control element 53 and monitoring the output wavelength while measuring the optical characteristics of the light-waveguide element 11. The circuit 58 thus performs feedback control of the temperature of the light-waveguide element 11 via the temperature sensor 36 to the optimum operating point.

When the light-waveguide element 11 and the temperature sensor 36 receives heat return in the form of reflecting the external or ambient temperature due to a change therein at the time of the initial setting, usually the operating point is deviated from the initially set temperature. In this embodiment of the temperature controller 51, however, the temperature sensing tip 41 of the temperature sensor 36 is buried in the metal plate 55, and the groove 62 is closed by the light-waveguide element 11. Also, as has been described before in connection with FIG. 2, the pair lead lines 42 and 43 which are liable to bring about heat return to the temperature sensing tip 41, are buried together with the highly heat conductive material 57. Furthermore, the lead lines 42 and 43 are led through the metal plate 55 from the position of the temperature sensing tip 41 not in a straight fashion to cover the minimum distance but in a spiral fashion as one curved form to cover a greatly increased distance.

Thus, regardless of any ambient temperature condition tending to cause heat return from the position 59 via the lead lines 42 and 43 to the temperature sensing tip 41, the heat energy corresponding to such ambient temperature change is absorbed in the metal plate 55 via the lead lines 42 and 43 therein covering a relatively long distance. The metal plate 55 itself is temperature controlled to a predetermined temperature by the temperature control element 53. Thus, the influence of the ambient temperature in the neighborhood of the position 59, as well as the influence of the ambient temperature in the neighborhood of the other edge portions of the metal plate 55, is weakened as one goes into the inside of the metal pate 55. It will thus be seen that particularly in the temperature sensing region 61 in the neighborhood of the center of the inside of the metal part 55, the lead lines 42 and 43 are at substantially the same temperature as the temperature of the metal in that region. It can thus be regarded that no heat return to the temperature sensing tip 41 is caused by any ambient temperature change.

In the embodiment of the temperature controller 51, the temperature sensing portion 41 thus can accurately measure the temperature of the light-waveguide element 11 corresponding to the temperature sensing region 61 without being influenced by the ambient temperature, that is, it is possible to realize stable temperature control at all times irrespective of ambient temperature changes.

Figure 3:
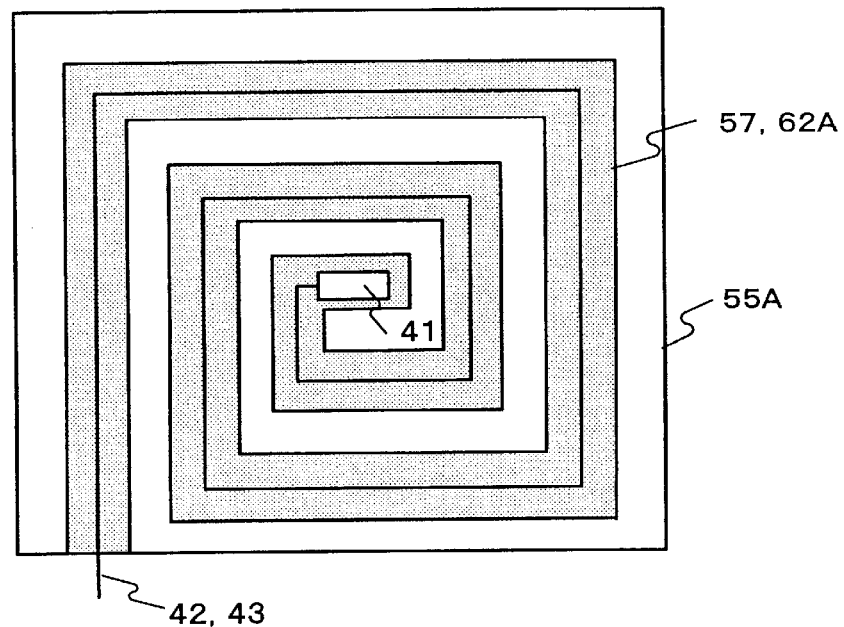
FIG. 3 shows a first modification of the embodiment of the present invention as a different example of temperature sensor buried in the metal plate.

FIG. 3 shows a first modification of the embodiment of the present invention as a different example of temperature sensor buried in the metal plate. In this example, the spiral groove 62A formed in the metal plate 55A has a length greater than in the case of the embodiment. It is thus possible to further reduce the influence of heat return via the lead lines 42 and 43.

Figure 4:
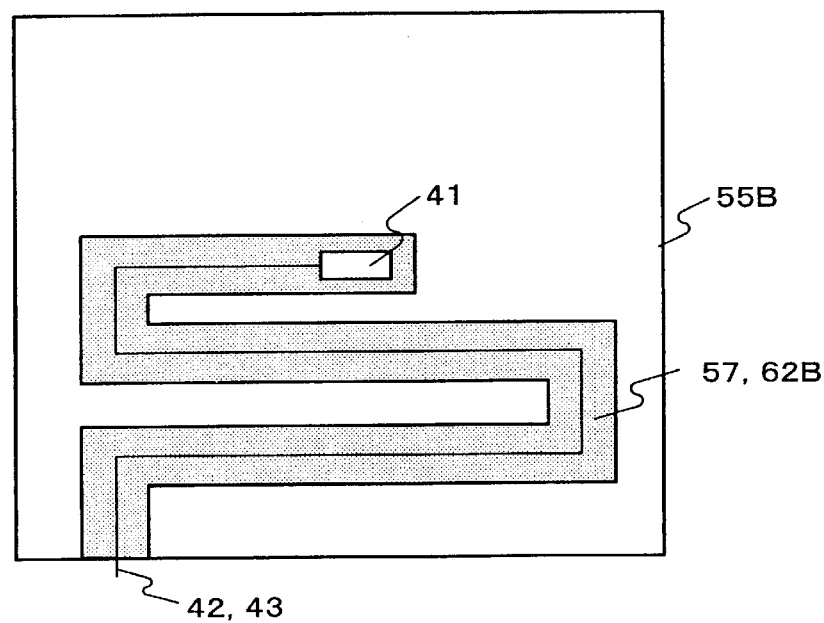
FIG. 4 shows a second modification of the embodiment of the present invention as a further example of temperature sensor buried in the metal plate.

FIG. 4 shows a second modification of the embodiment of the present invention as a further example of temperature sensor buried in the metal plate. In this example, the groove formed in the metal plate 55B is not spiral but meandering to the left and right. It is not necessary to form groove along the rectangular traces, and it is possible to provide curved grooves.

Figure 5:
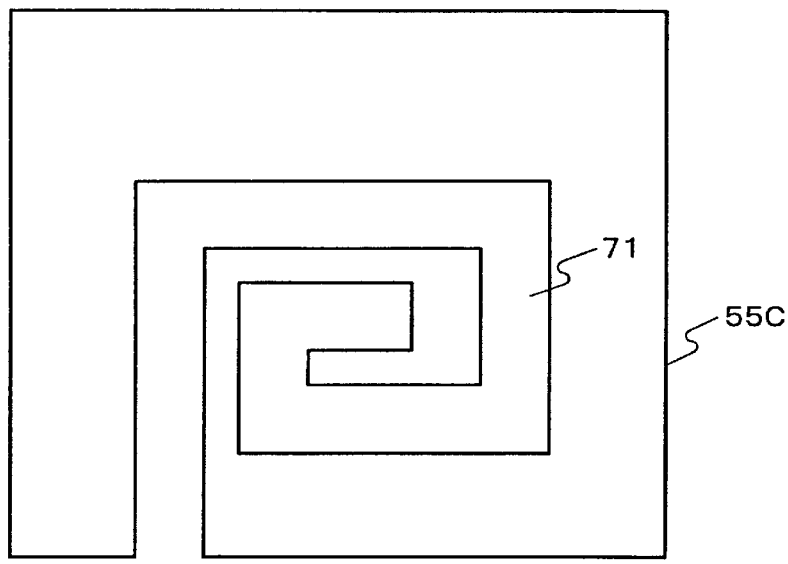
FIG. 5 shows a third modification of the embodiment of the present invention as a still further example of the metal plate.

FIG. 5 shows a third modification of the embodiment of the present invention as a still further example of the metal plate. In this example, the metal plate 55C is stamped off for the portion corresponding to the groove in the embodiment. A temperature sensor (not shown) may be buried together with the highly heat conductive material 57 in the space 71, which is formed by the stamping.

Figure 6:
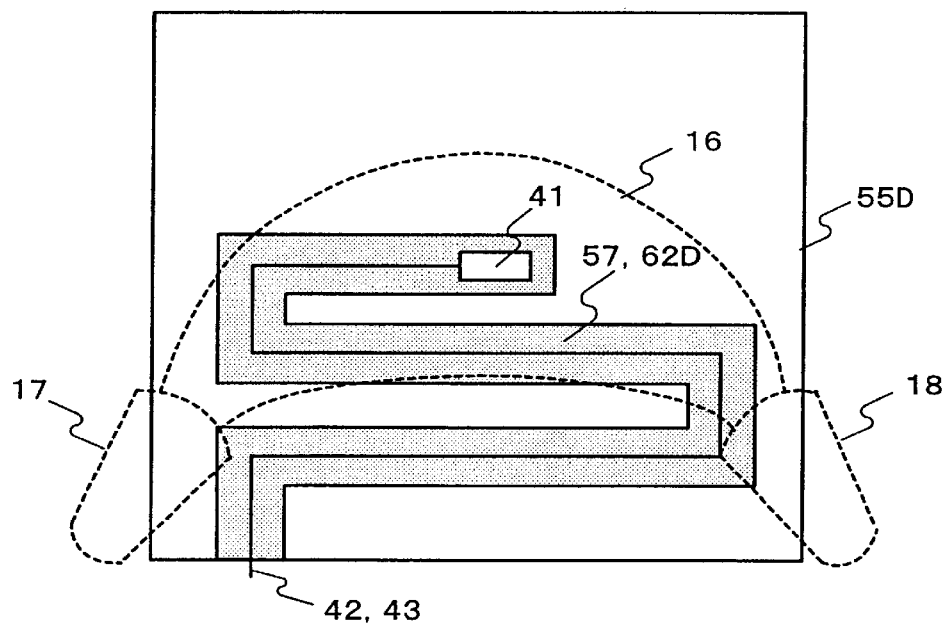
FIG. 6 shows a different example as the second modification of metal plate with temperature sensor buried therein.

FIG. 6 shows a different example as the second modification of metal plate with temperature sensor buried therein. In this case, the temperature sensor 41 is disposed in the metal plate 55D at a position thereof corresponding to the central position of the channel waveguide array 16 (see FIG. 7) as shown by broken lines. As in this case, by disposing the temperature sensor 41 in correspondence to the position of the channel waveguide array 16, more accurate temperature control is obtainable. The position of the temperature sensor 41 is not limited to one corresponding to the central position of the metal plate 55D.

In the embodiment as described above a copper plate is used as the metal plate. However, it is also possible to use other metal plates. As for the temperature sensor, it is of course possible to use other temperature sensors than the thermistor. Furthermore, while the above embodiment has concerned with the case of temperature controlling the light-waveguide element, the present invention is of course applicable to other temperature control subject components as well.

As has been described in the foregoing, according to the present invention as claimed in claims 1 to 7, the temperature sensing tip of the temperature sensor is disposed in the curved space of the heat conductor member at the predetermined position in the inner side of an edge of the heat conductor member, and portions of the relatively thin lead lines are led together with a filler buried in the curved space and have end portions led to be exposed to the outside. Thus, the heat return from the lead line portions to the temperature sensing tip of the temperature sensor can be substantially ignored, and it is possible to obtain high accuracy temperature control by the temperature control means. Besides, since the heat conductor material is disposed such that it intervenes between the temperature control element and the temperature control element, uniform temperature control of the temperature control subject component is obtainable even in the case where the temperature control element is small in size.

Also, according to the present invention as claimed in claim 2, the heat conductor member is in the form of a rectangular plate having one surface thereof formed with the space in the overall form of the rectangular spiral curve with progressively increasing sides from the position, at which the temperature sensing tip of the temperature sensor is buried. Thus, compared to the case where lead line trace is locally present in a portion of the heat conductive member, it is possible to hold the temperature of the heat conductor member more uniformly. Particularly, it is possible to have the temperature of the temperature sensing tip of the temperature sensor approach the temperature of the temperature control subject component more accurately.

Furthermore, according to the present invention as claimed in claim 4, the heat conductor member is formed as an excellently heat conductive metal plate greater in size than the Peltier element, and permits wide range temperature control of the temperature control subject component.

Still further, according to the present invention as claimed in claim 6, the lead lines of the temperature sensing element are relatively thin electric wires, and can thus reduce the ratio of the heat return to the temperature sensing tip of the temperature sensor.

Yet further, according to the present invention as claimed in claim 7, the curved space which is formed in the heat conductor member in the form of a single stroke line form the predetermined position up to the predetermined side edge portion of the member, extends in a folded fashion along a curved line approaching from the predetermined position to the predetermined side edge portion. This means that even where the single stroke line space is not in the spiral form due to such condition as that a predetermined region of the heat conductor member is penetrated by a member connecting components above and below that region, it is possible to use the single stroke line curved space extending in the folded fashion to approach from the predetermined position to the predetermined side edge portion insofar as that curved space is present. In other words, it is possible to adopt various curved spaces in dependence on the environment conditions of the temperature controller design and enhance the degree of freedom of design.

Further, according to the present invention as claimed in claim 8, the temperature sensing tip is disposed in the plate, and the leads lines have portions disposed in a bent fashion from the position of the temperature sensing tip up to an edge of the plate. Owing to these bent lead line portions the heat return to the temperature sensing tip of the temperature sensor can be substantially ignored, and it is possible to correspondingly increase the accuracy of the temperature control.

According to the present invention as claimed in claim 9, the temperature sensing tip is disposed in the plate; and the lead lines have spirally disposed portions from the position of the temperature sensing tip up to an edge of the plate. Thus, by the spirally disposed portions the heat return to the temperature sensing tip of the temperature sensor via the bent line portions can be substantially ignored, and it is thus possible to obtain high accuracy temperature control.

According to the present invention as claimed in claim 10, the temperature sensing tip is disposed in the plate; and the lead lines have meanderingly disposed portions from the position of the temperature sensing tip up to an edge of the plate. Thus, by the meanderingly disposed portions the heat return to the temperature sensing tip of the temperature sensor via the bent line portions can be substantially ignored, and it is thus possible to obtain high accuracy temperature control.

Further, according to the present invention as claimed in claim 11, the temperature controller according to one of claims 8 and 10 is provided, in which the plate has the space accommodating the temperature sensing tip and the lead lines disposed therein and filled with a resin. Thus, heat conducted from the outside via the lead lines escapes through the resin to the plate side, and the heat return to the temperature sensing tip thus can substantially ignored. Besides, since the lead lines are fixed in position by the resin, it is possible to obtain stable characteristics of the temperature controller even in the event of occurrence of vibrations or the like.

Further, according to the present invention as claimed in claim 12, the temperature controller according to claim 11 is provided, in which the plate is an inexpensive and good heat conductivity metal plate. It is thus possible to realize highly accurate temperature control without particularly increasing the system cost.

Further, according to the present invention as claimed in claims 13 to 16, the light-waveguide device with temperature controller is constructed by combining the temperature controller and the light-waveguide element according to claims 1 and 8 to 10 according to the present invention. Thus, highly accurate temperature control of the light-waveguide device is obtainable, and the heat return to the temperature sensing tip can be substantially ignored, thus correspondingly increasing the accuracy of the temperature control.

Further, according to the present invention as claimed in claim 17, the light-waveguide device according to one of claims 14 to 16 is provided, in which the temperature sensing tip is disposed at a position corresponding to the central position of the channel waveguide array of the light-waveguide element. Thus, the temperature of the channel waveguide array can be detected with high accuracy, and it is possible to realize a highly stable light-waveguide device.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A temperature controller comprising a temperature control element serving for heating or cooling, a temperature control subject component which is temperature controlled by the temperature control element and a plate intervening between the temperature controlled subject component and the temperature control element, and a temperature sensing element including a temperature sensing tip for detecting temperature and lead lines led out from the temperature sensing tip, wherein the temperature sensing tip is disposed in the plate, and wherein the lead lines have portions together with a filler disposed in a bent fashion through a curved space from the position of the temperature sensing tip up to an edge of the plate.

2. The temperature controller according to claim 1, wherein said lead lines are completely buried in a heat conductor member.

3. The temperature controller according to claim 1, wherein said temperature sensing tip of said temperature element is buried in a temperature sensing region substantially at a central position of said temperature sensing region.

4. The temperature controller according to claim 1, wherein an absorption of heat energy corresponding to an ambient temperature change occurs in a predetermined length of said lead lines.

5. The temperature controller according to claim 1, wherein said curved space comprises a spiral curved space.

6. The temperature controller according to claim 1, wherein said plate is provided with a groove filled with a heat conductive material.

7. A temperature controller comprising:
   a temperature control element for heating and cooling;
   a temperature control subject component which is temperature controlled by the temperature control element;
   a plate disposed between the temperature control element and the temperature control subject component; and
   a temperature sensor element including a temperature sensor portion for sensing a temperature and a lead line provided from the temperature sensor portion;
   wherein the plate is provided with a groove on an opposed surface to the temperature control subject component and the temperature sensor portion, and the lead line is provided between the temperature control subject component and the plate in the groove.

8. The temperature controller according to claim 7, wherein the groove is filled up with a heat conductive material.

9. The temperature controller according to claim 8, wherein the heat conductive material comprises a metal.

10. The temperature controller according to claim 7, wherein the plate comprises a heat conductive material.

11. The temperature controller according to claim 7, wherein the groove includes a spiral portion.

12. The temperature controller according to claim 7, wherein the groove includes a meander portion.

* * * * *